(12) United States Patent
Schmarr

(10) Patent No.: US 6,571,979 B2
(45) Date of Patent: Jun. 3, 2003

(54) ICE CREAM HOLDER

(76) Inventor: Rodney Neil Schmarr, 57 Albert Street, Petersham Sydney NSW (AU), 2049

( * ) Notice: Subject to any disclaimer, the term of this patent is extended or adjusted under 35 U.S.C. 154(b) by 0 days.

(21) Appl. No.: 09/790,126

(22) Filed: Feb. 21, 2001

(65) Prior Publication Data

US 2001/0017299 A1 Aug. 30, 2001

(30) Foreign Application Priority Data

Feb. 29, 2000 (AU) .............................................. PQ5898

(51) Int. Cl.⁷ ................................................. B65D 1/36
(52) U.S. Cl. ....................................... 220/571; 220/501
(58) Field of Search ................................ 220/571, 575, 220/501, 503, 504, 505, 556, 555, 592.12, 592.13, 592.14, 592.15, 4.03, 4.04, 62.13, 601, 630, 719, 731, 735, DIG. 6

(56) References Cited

U.S. PATENT DOCUMENTS 5,515,998 A    5/1996   Wang

FOREIGN PATENT DOCUMENTS

GB          2328366 A   *   2/1999

* cited by examiner

*Primary Examiner*—Stephen Castellano
(74) *Attorney, Agent, or Firm*—Harrison & Egbert

(57) ABSTRACT

A holder for an ice cream having a stick includes a handle having a drip-receiving cavity. A drip catchment member is attached to or formed integrally with the handle and includes a catchment surface for receiving drips from the ice cream. A stick-receiving aperture receives the stick to support the ice cream above the catchment surface and a drain enables any drips caught by the catchment surface to migrate into the cavity.

8 Claims, 2 Drawing Sheets

ICE CREAM HOLDER

BACKGROUND OF THE INVENTION

1. Field of the Invention

The following invention relates to a holder for ice creams or ice blocks. More particularly, though not exclusively, the invention relates to an ice cream holder for children, typically between the ages of about 2 and 7.

2. Description of Related Art

Small children often find it difficult to grip the small wooden or plastics sticks protruding from the bottom of an ice cream or ice block and often lose their grip resulting in the ice cream or ice block being dropped to the ground and wasted.

Another problem is that associated with the dripping of melting material from the ice cream or ice block which often ends up on the children's hands clothes and other places causing a mess. This problem is exacerbated in indoor situations where carpet and furnishings can be soiled.

It is the object of the present invention to overcome or substantially ameliorate at least one of the above disadvantages and/or more generally to provide an ice cream holder.

As used herein, "ice cream" is intended to encompass ice creams, ice blocks and all manner of edible items that might melt or otherwise drip. Such items generally have a small holding stick protruding from one end thereof. The term is therefore intended to encompass chocolate coated ice creams, biscuit crumb coated ice creams, flavored ice blocks and the like.

Also, as used herein, the term "stick" is intended to encompass the wooden or plastic paddles around a portion of which an ice cream is formed so as to leave the remaining portion projecting from the ice cream and intended to be grasped during consumption of the ice cream.

BRIEF SUMMARY OF THE INVENTION

There is disclosed herein a holder for an ice cream having a stick, the holder comprising:

a handle having a drip-receiving cavity therein, a drip catchment member attached to or formed integrally with the handle and including a catchment surface for receiving drips from the ice cream, a support means for receiving the stick so as to support the ice cream above said catchment surface, and a passage enabling any drips caught by said catchment surface to migrate into said cavity.

Preferably said drip catchment member is funnel-shaped.

Preferably said cavity is substantially cylindrical in form.

Preferably said support means includes a recess into which the stick is receivable.

Preferably said support means includes a pair of opposed slots into which respective opposed edges of the stick are receivable.

Preferably two pairs of opposed slots are provided, one pair comprising slots separated by a space for large sticks and the other pair separated by a smaller space for smaller sticks.

Preferably the support means and passage are formed as a common opening, with the slots spaced around the common opening.

Preferably the common opening leads to a drain that extends into the cavity such that upon inversion of the holder, any drips within the cavity do not exit through the opening.

Preferably the handle has a plug associated therewith.

The plug might form a base for the holder.

The base might extend radially beyond the handle for stability.

Preferably the holder is formed of molded plastics material.

Preferably the handle and the drip catchment member are formed as an integral component.

BRIEF DESCRIPTION OF THE SEVERAL VIEWS OF THE DRAWINGS

A preferred form of the present invention will now be described by way of example with reference to the accompanying drawings.

DESCRIPTION OF THE INVENTION

Figure 1:
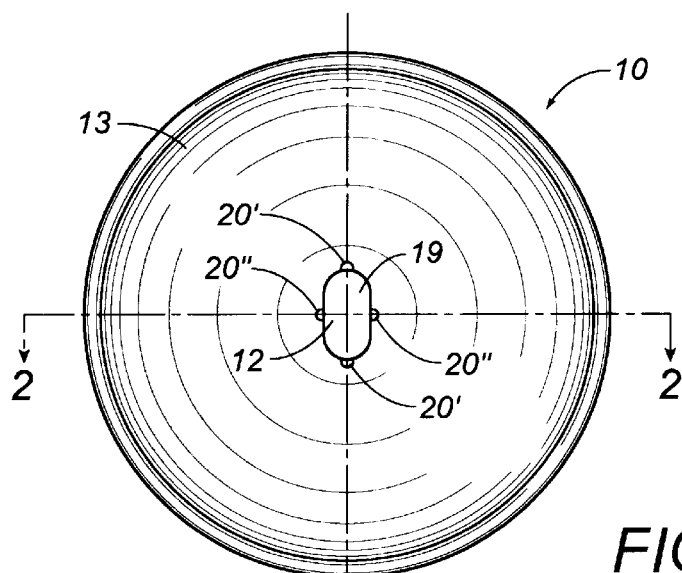
FIG. 1 is a schematic plan view of an ice cream holder.

In the accompanying drawings, there is schematically depicted an ice cream holder 10. The holder is typically formed of molded plastic material and includes a handle 14 which has a hollow internal cavity 21. Extending upwardly from the handle 14 is a catchment member or funnel 13.

At a transition zone 22 between the funnel 13 and the handle 14, there hangs an ice cream stick support tube 15 having an aperture 19 into which the stick 12 is received so as to support the ice cream 11 above the funnel 13.

The aperture 19 provides a passage through which drips can migrate into cavity 21.

The tube 15 has extending therefrom a drain 16 through which the drips pass. Within the tube 15, there are provided two pairs of opposed slots 20' and 20". A small or standard sized stick 12 is shown having its edges received within the opposed slots 20" leaving spaces at either side of the stick 12 through which drips can migrate.

As an alternative to slots 20", ice creams having larger sticks can be inserted at a 90° orientation so that the edges of the stick engage with slots 20', still providing spaces at either side through which drips can migrate through the tube 15 and drain 16.

The drain 16 extends sufficiently into the cavity 21 such that upon inversion of the cavity, liquid retained therein can migrate along the internal walls of the cavity 21 to the position indicated at 24.

Figure 4:
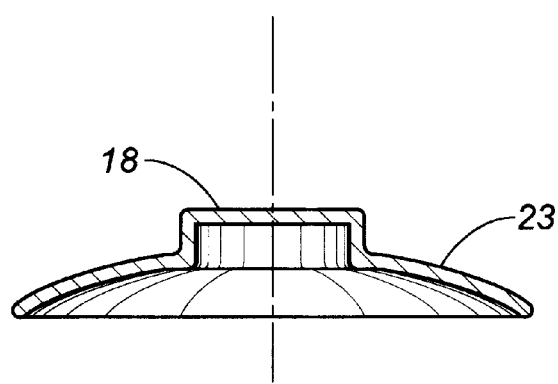

A plug 18 is snap-engaged, screwed, or otherwise sealed to the bottom of handle 14. This plug can be replaced by an alternative plug as shown in FIG. 4 having an annular extension 23 somewhat like that of a wine glass so as to enable the holder 10 to be supported upon a surface in a stable manner.

In use, a child's parent can unwrap the ice cream and grasp the stick just below the ice cream 11 and insert the base of the stick into the aperture 19 such that the edges of the stick engage with slots 20' or 20". The apparatus can then be handed to the child who can grasp the handle 14 and consume the ice cream without making a mess.

The plug 18 can be removed from the handle 14 to enable internal cleaning. Alternatively, the handle 14 might be attached to the funnel at zone 22, and be separable to assist in internal cleaning.

Figure 2:
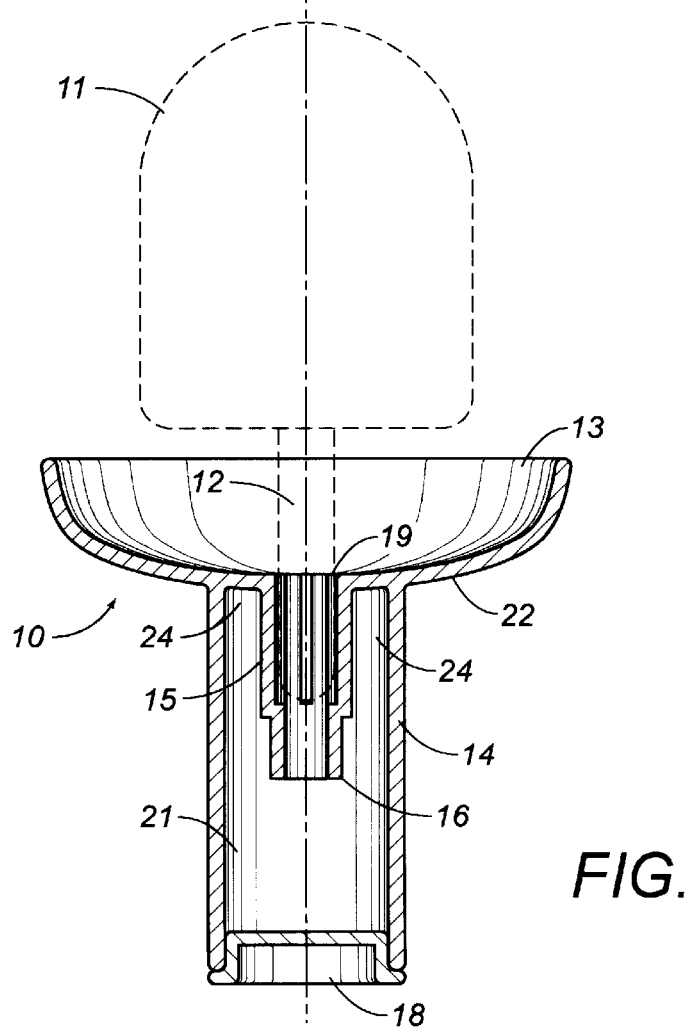
FIG. 2 is a schematic cross-sectional elevational view of the ice cream holder of FIG. 1.
Figure 3:
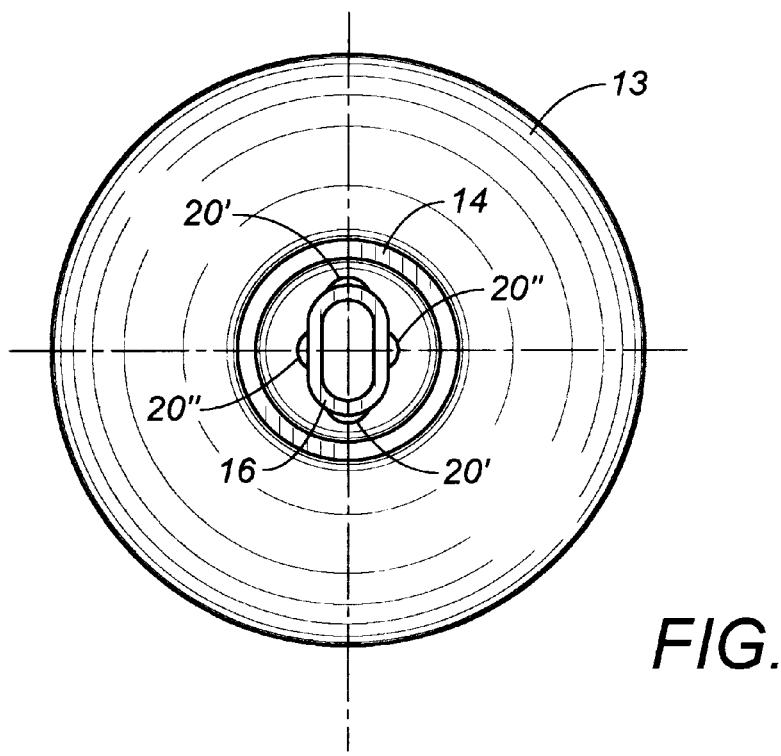
FIG. 3 is a schematic inverted plan view of the holder of FIGS. 1 and 2 with its plug removed and FIG. 4 is a schematic cross-sectional elevational view of an alternative plug.

It should be appreciated that modifications and alterations obvious to those skilled in the art are not to be considered as beyond the scope of the present invention. For example, rather than being circular in plan as shown in FIG. 2, the apparatus might be rectangular or oval shaped for example.

I claim:

1. A holder for ice cream on a stick, the holder comprising:
    a handle having a side wall defining at least a portion of a drip-receiving cavity therein;
    a drip catching member joined to said handle, said drip catching member having a catchment means with a surface positioned for receiving drips from the ice cream, said drip catching member having an aperture extending therethrough so as to open through said surface of said catchment means; and
    a skirt means extending from said drip catching member into said drip-receiving cavity, said skirt means defining a passage extending from said aperture and opening into said cavity, said skirt means for causing drips received by said catchment means to migrate through said aperture into said cavity, said skirt means having a support means for receiving the stick within said passage and for supporting the ice cream above said surface of said catchment means, said skirt means being spaced inwardly from said side wall such that said skirt means and said side wall define at least a portion of a channel means extending entirely around said passage, said channel means for trapping the drips in said cavity when the holder is inverted, said support means has two pairs of opposed slots, one pair of opposed slots comprising slots separated by a space and the other pair of opposed slots separated by a smaller space, one of said two pairs of opposed slots arranged so as to receive respective opposed edges of the stick.

2. The holder of claim 1 wherein the drip catching member is funnel-shaped.

3. The holder of claim 1 wherein said cavity is substantially cylindrically shaped.

4. The holder of claim 1 wherein said support means and said passage are formed as a common opening, said two pairs of opposed slots being spaced around said common opening.

5. The holder of claim 1 wherein said handle has an opening and a plug removably retained therein so as to close said opening.

6. The holder of claim 5 wherein said plug extends radially outwardly of said handle.

7. The holder of claim 1 wherein said handle and said drip catching member and said skirt means are formed of a molded polymeric material.

8. The holder of claim 1 wherein said handle and said drip catching member are integrally formed together.

* * * * *